United States Patent
Burks et al.

[11] 3,721,902
[45] March 20, 1973

[54] THERMAL SENSING OF CURRENT CARRYING MEDIUMS

[76] Inventors: Warren C. Burks, 4186 Inglewood, Anaheim 90309; Jack G. Lawrence, 11242 Barclay Dr., Garden Grove 92641, both of Calif.

[22] Filed: March 10, 1970

[21] Appl. No.: 18,237

[52] U.S. Cl. ..................................324/106, 321/1.5
[51] Int. Cl. ..........................G01r 5/26, H02h 5/04
[58] Field of Search........324/106; 174/11; 338/23 R; 317/41; 340/253 A; 321/1.5; 322/2; 310/4; 136/207

[56] References Cited

UNITED STATES PATENTS

| | | | |
|---|---|---|---|
| 2,280,257 | 4/1942 | Pearson | 338/23 |
| 2,645,756 | 7/1953 | Goodwin, Jr. | 324/106 |
| 3,163,703 | 12/1964 | McLoad | 174/11 |
| 3,172,011 | 3/1965 | Flanagan | 317/41 |
| 3,204,231 | 8/1965 | Kolster | 340/253 A |
| 1,643,582 | 9/1927 | Martin | 324/106 |
| 2,979,551 | 4/1961 | Pack | 321/1.5 X |

FOREIGN PATENTS OR APPLICATIONS

| | | | |
|---|---|---|---|
| 58,226 | 12/1940 | Denmark | 338/23 |
| 64,121 | 8/1949 | Netherlands | 338/23 |

*Primary Examiner*—Rudolph V. Rolinec
*Assistant Examiner*—Ernest F. Karlsen

[57] ABSTRACT

Thermal conditions of an electrical current carrying medium are made known by locating a thermal sensing device within the body structure of the current carrying medium.

1 Claim, 4 Drawing Figures

THERMAL SENSING OF CURRENT CARRYING MEDIUMS

This invention relates to a procedure for the determination of the thermal condition of a current carrying medium. More specifically this invention is concerned with identifying the "internal" and/or confined temperature of an electrical current carrying medium which may be damaging to the medium or to any device(s) being heated by the medium.

It is desirable to know the precise temperature of a current carrying medium used to:
a. transport an electrical potential, and in
b. thermal transfer operations the thermal state of the heating medium.

The successful conclusion of a variety of technological endeavors requires explicit control of the thermal conditions of a current carrying medium. Use of a thermal sensing device in temperature measurement and control has been universally accepted. An extremely difficult problem has been encountered in the precise measurement of the temperature of a current carrying medium. These problems became more severe as the circular mill area of the current carrying medium approaches the small miniature sizes.

Initially, a thermal sensor that sensed the "localized environmental thermal conditions" of the current carrying medium was employed. Variation in radiation and convection currents adjacent to the thermal sensor were responsible for preventing the accurate detection of the true thermal condition(s).

A second approach to the problem was to attach the thermal sensor directly to the exterior surface of the current carrying medium by first fusion and then resistence welding. Variations in the medium oxide scale, skin thickness, additional mass due to welding, and the thermal "bleed-off" paths provided by the thermal sensor leads were responsible for an unknown built-in time delay or lag in the thermal rate of change in the current carrying medium.

A second problem experienced with the use of the conventional thermal sensor applications was the exposure of the fragile thermal sensor leads to hostile environments.

A third problem was that the thermal sensor body interfered with the normal installation procedure.

Hence, it is a primary objective of the present invention to provide a new and improved procedure in resistive thermal management whereby a thermal sensing device may be employed in order to accurately determine the thermal conditions of a current carrying medium.

An additional objective of the present invention is to provide for a safe and secure environment where the thermal sensing device is protected from hostile environments, thus insuring a greatly increased operation life.

A further objective of the present invention is to provide a procedure that is relatively simple to implement, but which is highly accurate and extremely sensitive.

Other objectives and advantages will be more apparent to those skilled in this art from the specifications and claims and the following descriptions of the accompanying drawings in which:

Figure 1:
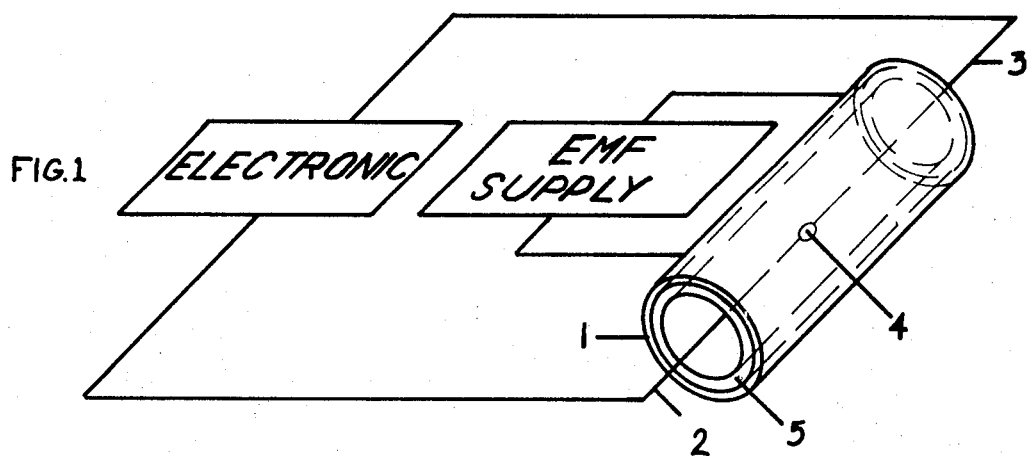
FIG. 1 is a diagrammatic view of a typical electronically controlled circuit identifying the relative position of the thermal sensing device within the body structure of a current carrying medium.
Figure 2:
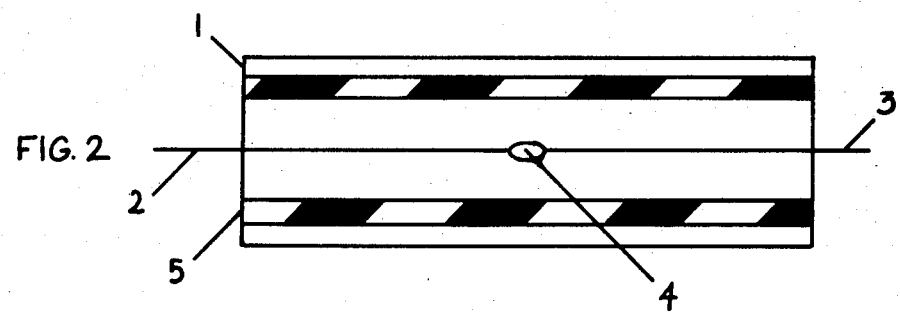
FIG. 2 is a portion of an enlarged cross sectional fragmentary top view of a current carrying medium with a thermal sensor positioned within the medium.
Figure 3:
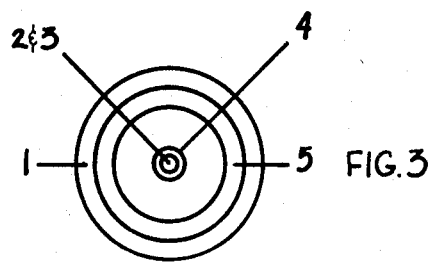
FIG. 3 is an end view.
Figure 4:
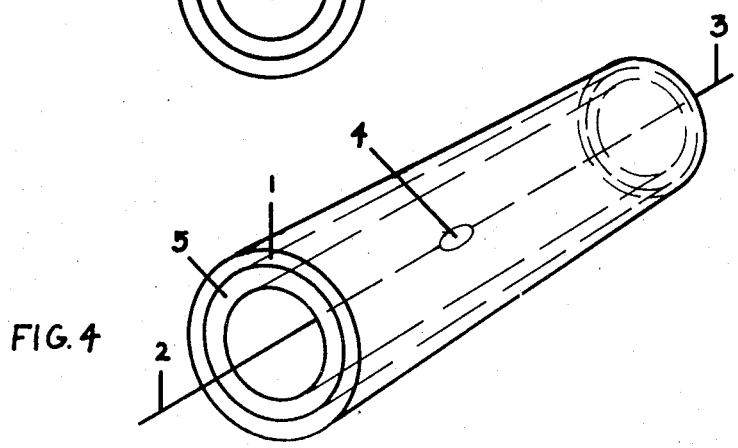
FIG. 4 is an isometric view indicating the relative position of the thermal sensor.

Referring now more particularly to the drawing, FIG. 2 illustrates an enlarged section of a current carrying medium 1 containing a pair of thermal sensing element leads 2 and 3 terminating as a sensing element 4 and electrically isolated by insulator 5. The electrical characteristics of thermal sensing element 4 will determine the temperature of the current carrying medium 1. The thermal sensor leads 2 and 3 may extend out for connections to suitable leads, which are connected in usual and appropriate circuits. The cross sectional area of the current carrying medium has been modified in order to not reduce the cross sectional area at the position where the thermal sensing device is located.

It is to be understood that the current carrying medium may be any desired length and the plurality of sensing junction may be spaced at the desired point of location for temperature measurement. For clarity, only one 1 sensing junction has been shown. It is obvious that the current carrying medium may contain more than one 1 thermal sensing device. The thermal sensing device may be fabricated from any thermo elements that will respond to the thermal conditions of the current carrying medium. The current carrying medium may be fabricated from any material that will satisfy the application requirements.

To fully understand the extreme importance of this invention, it must be fully understood that a thermal sensing device is located "within" the current carrying medium at the position where the measurement and control of temperature is desired.

As a result of this procedure the thermal sensing device 4 is secured within the body of the current carrying medium 1 and electrically insulated by insulator 5. The position of the thermal sensing device 4 may be carefully adjusted within the current carrying medium 1 to measure temperatures at a precisely known area. It can be seen that this procedure places the thermal sensing device 4 within the current carrying medium 1 and has the unique advantage of being "surrounded" by the heat generating medium.

A typical application for this procedure would be the sensing and control of temperature generated within a current carrying medium to:
a. provide a warning for "thermal over-load" or "thermal run-away" condition, and/or
b. in direct thermal transfer operations provide for identification of an exacting process temperature(s).

From the foregoing disclosure it is seen that a procedure has been employed that will detect and respond to the resistive friction of a medium subjected to an electro motive force.

It will, of course, be understood that various changes in this procedure and arrangement of parts may be made by those skilled in this art without departing from the spirit of the invention.

What is claimed is:

1. A current detector device comprising, a tubular conductor element which provides a singular circuit path of unit length, the cross section of the tubular conductor element being uniform along its longitudinal axis, a thermally conductive insulating dielectric material lining the tubular conductor to form a hollow cylindrical space, a heat sensor bead positioned within the hollow cylindrical space, said bead being formed of any material constituent which responds to temperature change, said bead having axially connected and longitudinally extending conductor lead wires, the sensor bead and connecting lead wires being electrically isolated and protected from the circular wall of the tubular conductor element by the insulating dielectric material, means for connecting the tubular conductor element in an electrical circuit, the tubular conductor element thus providing an envelope which surrounds the sensor bead for accurate and reliable detection of the existing thermal state of the tubular conductor element when a current is impressed therethrough, the sensor bead responding to temperature changes occurring in the tubular conductor element as current demands are made on the electrical circuit in which the tubular conductor element is a member, and monitoring means for sensing an electrical parameter of the sensor bead and displaying and indication of that parameter.

* * * * *